Aug. 28, 1956 T. McELRATH ET AL 2,761,049
WATER COOLED SIGMA GUIDE TUBE
Filed Sept. 28, 1953
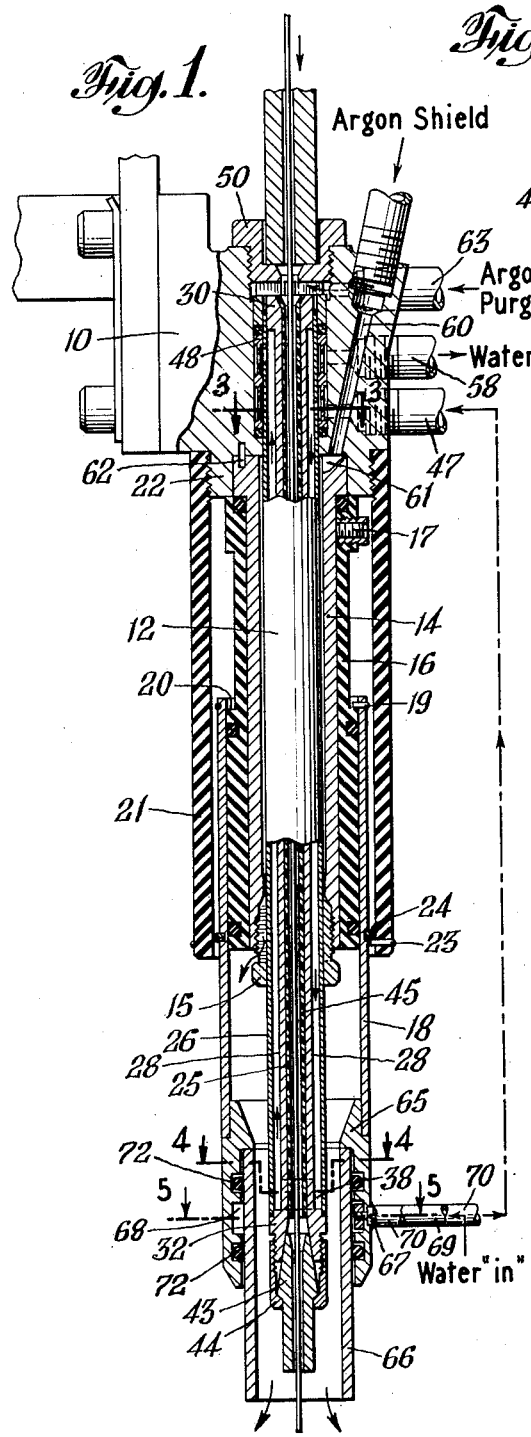
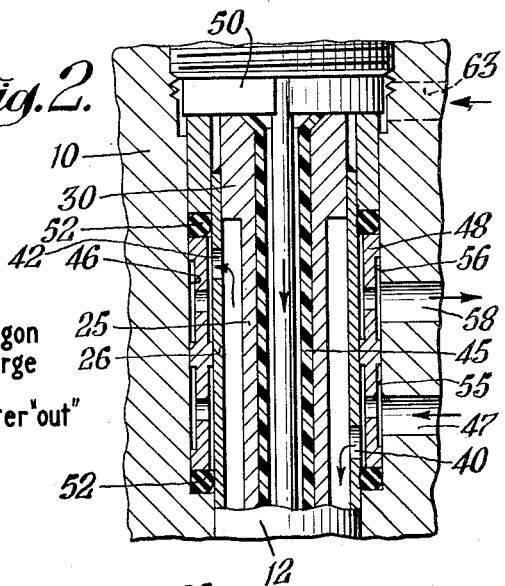
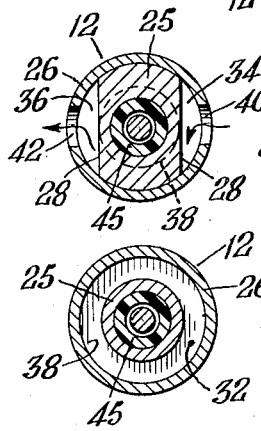
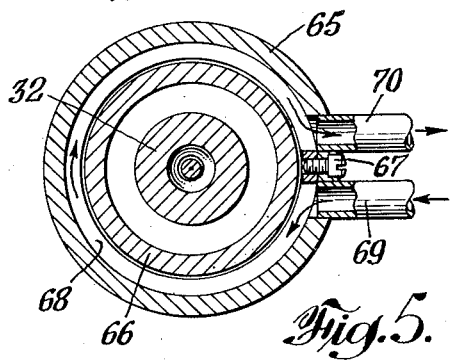
INVENTORS
THOMAS McELRATH
ARTHUR P. SCHELLER
BY Richard S. Shreve Jr.
ATTORNEY

2,761,049

WATER COOLED SIGMA GUIDE TUBE

Thomas McElrath and Arthur P. Scheller, Chatham, N. J., assignors to Union Carbide and Carbon Corporation, a corporation of New York Application September 28, 1953, Serial No. 382,761

1 Claim. (Cl. 219—14)

This invention relates to inert gas shielded metal arc welding, known to the art as sigma welding, in which a continuous wire electrode is fed from a coil through a wire drive mechanism, and passes through a guide tube and an inert gas shield for the arc which consumes the electrode to produce the weld. A control circuit maintains the feeding of the wire into the arc, the arc being maintained between the end of the electrode wire and the workpiece. Common wire diameters are $3/64$ inch, $1/16$ inch, $3/32$ inch and $1/8$ inch in diameter.

The contact guide tube, according to past practices, was made of $1/4$ inch O. D., 4 inches to 9 inches long and containing an inside bore a calculated percentage larger than the intended wire size. This tube had two very important functions: first, to guide the wire precisely into the center of the inert gas protection zone and accurately coincident with the intended line of weld; and second, to transfer welding current by sliding contact from the guide tube to the moving wire.

Copper tubing was originally selected as the material for these tubes because of the good electrical and heat conductivity of copper and the simplicity of using straight tubing, but the copper tubes after heating in use become soft and easily bent. This causes the wire to be fed away from the center of inert gas protection and this in turn leads to unstable arc and porosity in the weld. The bending also prevents the maintenance of accurate alignment between the arc and the line of weld. Poor contact has been a source of difficulty in producing good sigma welds and with certain wire no suitable contact could be established.

This problem persisted as long as copper was employed. Use of ferrous tubes immediately gave good contact and a stable arc, but they eroded very quickly because of the high temperature involved and because of the intermittent heating and cooling cycles between welding and not welding. Carbon steel tubes oxidize quickly and stainless steel guide tubes also overheat and seize on the rod and also fail.

The close proximity of the tube end to the arc causes an unduly high temperature on the tube end. This allows weld spatter to collect readily on the tube end which interferes with gas protection and in time causes the wire to bend at the tube exit.

The objects of the present invention are to avoid the difficulties referred to above, to provide a water cooled guide tube, to provide the guide tube with a ferrous metal wall, to provide an insulating liner for the guide tube, and otherwise improve the construction and operation and mounting of electrode guide tubes for inert gas shielded metal arc welding.

According to the present invention, the apparatus for inert gas shielded metal arc welding comprises a current and gas supplying head, a tube holder barrel secured to said head, an electrode wire guide tube mounted in said barrel, an electrode contactor tip removably secured to the lower end of said guide tube, a gas confining nozzle mounted on said barrel and surrounding said contactor tip, and means in said head for supplying gas and electric welding current to said barrel and electrode wire to said guide tube and contactor tip. Preferably the guide tube comprises inner and outer walls joined at their ends to form a cooling jacket, and said head has means for circulating cooling medium through said guide tube cooling jacket. Preferably an insulating liner is provided in the guide tube above said contactor tip. The inner wall of the cooling jacket is preferably constructed of ferrous metal. This nozzle is preferably retractable to expose the contactor tip, and the nozzle is preferably removable for access to clamping means for securing the guide tube in the barrel.

Other objects and features of novelty will be apparent from the following description with reference to the accompanying drawings in which:

Fig. 1 is a vertical section through apparatus for inert gas blanketed metal arc welding according to the preferred embodiment of the present invention;

Fig. 2 is an enlarged detailed section of the top of Fig. 1;

Fig. 3 is a transverse section taken along the line 3—3 of Fig. 1;

Fig. 4 is a transverse section taken along the line 4—4 of Fig. 1; and

Fig. 5 is a transverse section taken along the line 5—5 of Fig. 1.

The apparatus for inert gas shielded metal arc welding shown in the drawing comprises a current and gas supplying head 10 having a bore receiving an electrode wire guide tube 12. The head 10 has a circular recess into which is secured a tube holder barrel 14 concentric with the guide tube 12. A clamp nut 15 screwed into the bottom of the barrel 14 secures the guide tube 12 in position therein.

Surrounding the holder 14 is an insulating sleeve 16 held in position thereon by a set screw 17. The sleeve 16 is constructed of suitable non-hygroscopic insulating material.

Slidable on the outside of the insulating sleeve 16 is a nozzle supporting sleeve 18, the upper end of which carries a snap ring having an inwardly extending end 19 forming a stop engaging a shoulder 20 on the insulating sleeve 16 to limit the downwardly slidable extent of the nozzle support sleeve 18.

Surrounding the nozzle support sleeve 18 is an outer insulating sleeve 21 which is screwed into a threaded boss 22 on the torch head 10. The lower end of the outer sleeve 21 carries a snap ring having an inwardly extending end 23 which engages a snap ring 24 on the outside of the support sleeve 18 to supplement the action of the stop 19.

The guide tube 12 is preferably double walled, comprising an inner member 25 of stainless steel, carbon steel, or copper, and an outer tube 26 of the same metal. In the form shown in Fig. 3 the inner member 25 is slabbed off or flattened as at 28 on opposite sides intermediate its ends. The upper end forms a cylindrical head 30 to which the upper end of the outer tube 26 is silver soldered. The lower end of the inner member 25 forms a cylindrical foot 32 to which the lower end of the outer tube 26 is similarly secured. Thus, the flattened sides of the inner member form an inlet passage 34 and an outlet passage 36 for cooling medium. As shown in Fig. 4, the inner member 25 has an annular groove 38 above the foot 32, connecting the bottoms of the passages 34 and 36. The upper end of the outer tube 26 is provided with an inlet 40 into the chamber 34 and an outlet 42 from the chamber 36 for cooling medium.

The foot 32 of the guide tube 12 has a conical bore receiving a contactor tip 43, which is held in position by a cap nut 44 threaded on the outside of the foot 32. The bore in the contactor tip 43 is only slightly larger than the diameter of the electrode wire, but the bore in the inner member 25 of the guide tube 12 is sufficiently larger than the electrode wire to receive an insulating liner tube 45 of nylon or other electrically insulating material. This liner stabilizes the arc by preventing the electric welding current from reaching the wire electrode before the wire reaches the contactor tip 43.

The central bore in the head 10 which receives the guide tube 12 has an enlarged upper portion which forms a water distribution chamber 46. Cooling medium is supplied to this chamber by an inlet tube 47. Mounted in the chamber 46 is a grid member 48 held in position by a cap nut 50. For sealing the chamber 46 against leakage, O-rings 52 are provided between the nut 50 and the top of the grid 48, and between the bottom of the grid and the shoulder at the bottom of the chamber 46.

The grid 48 has a lower annular inlet passage 55 receiving cooling medium from the inlet tube 47 and delivering it to the guide tube jacket inlet 40. The upper end of the grid 48 has an annular outlet passage 56 which receives cooling medium from the guide tube jacket outlet 42 and delivers it to the outlet tube 58.

The O-rings 52 form a slidable seal, so that the guide tube may be removed and replaced without disconnecting any piping such as the tubes 47 and 58. Also the annular passages 55 and 56 reconnect the inlet and outles passages regardless of the angular disposition of the replaced guide tube.

The shielding argon is supplied through a bore 60 in the head 10, which registers with a slot 61 in the top of the holder 14 leading to the central bore thereof. The head 10 is provided with a drilled hole receiving a pin 62 on the top of the holder 14 which acts as a key to insure register of the slot 61 with the bore 60 in assembly, before the holder is silver soldered in position.

In order to remove atmospheric air from the electrode passage on the guide tube, an argon purge is provided, having an inlet 63 leading to an annular chamber under a cap 50 in communication with the interior of the nylon liner 45.

The lower end of the nozzle supporting sleeve 18 is secured to a cooling jacket 65, in which a gas cup 66 is slidably received and held in position by a set screw 67. The jacket 65 has an internal annular groove 68 which cooperates with the outer surface of the gas cap 66 to form therebetween an annular cooling chamber having an inlet 69 and an outlet 70 leading to the inlet 47 in the head 10. The jacket 65 has O-rings 72 above and below the groove 68 to prevent leakage therefrom and forming a slidable seal, whereby the gas cap 66 may be removed and replaced without disconnecting any piping.

When it is desired to inspect or replace the electrode contactor tip 43, the nozzle supporting sleeve 18 is pushed upward, sliding on the insulating sleeve 16 inside the outer sleeve 21. This brings the nozzle jacket 65 and gas cap 66 above the contactor tip 43, for access to the cap nut 44.

When it is desired to remove the guide tube 12 the outer sleeve 21 is unscrewed from the boss 22, and lowered to expose the set screw 17 for release, after which the insulating sleeve 16 and all parts outside thereof can be slid down off of the holder 14 and over the cap nut 15 to expose it for release.

What is claimed is:

An apparatus for inert gas shielded metal arc welding, a current, gas and water supplying head having a tube holder barrel, a double walled guide tube mounted in said barrel and comprising inner and outer walls joined at their end to form an annular cooling jacket, said inner wall being adapted to slidably receive an electrode wire continuously fed therethrough, an electric contactor tip removably secured to the lower end of said double walled guide tube for slidably engaging and continuously supplying welding current to the moving electrode coming out of said inner wall, a gas confining nozzle mounted on said barrel and surrounding said contactor tip, and means in said head for supplying gas and electric welding current to said barrel, electrode wire to said guide tube, and for circulating cooling medium through said guide tube cooling jacket characterized in that the lower ends of said inner and outer walls are connected by a cylindrical foot defining an annular groove directly above such foot connecting the bottoms of longitudinal cooling liquid passages between said inner and outer walls, and said foot has a conical seat for receiving said contactor tip which is held in place by a cap nut threaded on the outside of said foot.

References Cited in the file of this patent

UNITED STATES PATENTS

| | | |
|---|---|---|
| 2,473,258 | Potter | June 14, 1949 |
| 2,547,872 | Kissick | Apr. 3, 1951 |
| 2,554,236 | Bernard | May 22, 1951 |
| 2,636,967 | Bassot | Apr. 28, 1953 |
| 2,659,796 | Anderson | Nov. 17, 1953 |